March 10, 1970  J. F. FRANCK  3,499,611
REEL FOR WINDING FILM
Filed Aug. 28, 1967
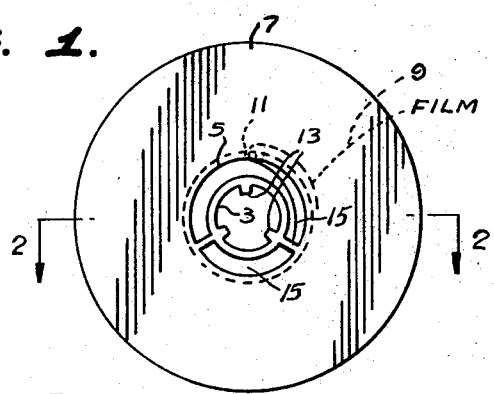
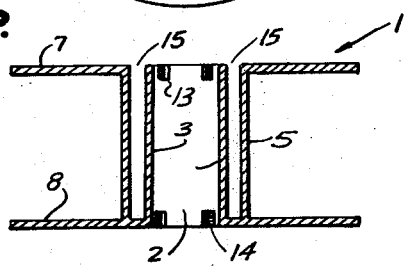
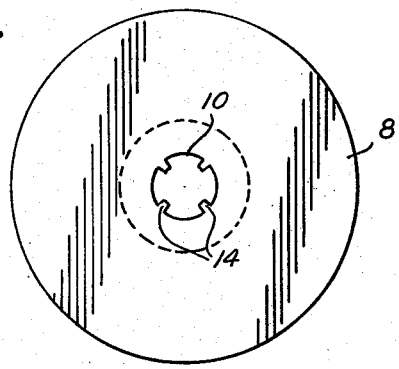
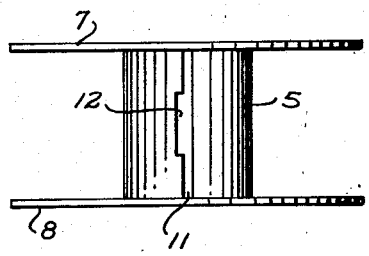
INVENTOR.
JULES FRANCK,
BY
ATTORNEYS.

United States Patent Office 3,499,611
Patented Mar. 10, 1970

3,499,611
REEL FOR WINDING FILM
Jules Florine Franck, 61 Bredabasn,
Brasschaat, Belgium
Continuation-in-part of abandoned application Ser. No. 403,251, Oct. 12, 1964. This application Aug. 28, 1967, Ser. No. 663,572
Int. Cl. B65h 75/18
U.S. Cl. 242—71.8                 2 Claims

ABSTRACT OF THE DISCLOSURE

The present reel is for having strip material wound thereon and the reel mounted on a shaft of, for example, a photographic apparatus. The reel has a hub with a different number of teeth at one end than at its other end and the teeth at one end only will fit on said shaft to prevent the reel from being incorrectly mounted on the shaft.

---

The present application is a continuation-in-part application of my copending application, Ser. No. 403,251, filed Oct. 12, 1964, now abandoned.

This invention concerns a reel made as a one-piece and useful for winding a material in the shape of strips of great length.

Already known are reels comprising a hub and two disc shaped flanges at the ends of the hub, which hub has a central bore provided with teeth.

Such reels have the disadvantage that the reel can be mounted on the shaft of a photographic apparatus provided with grooves, either from the lefthand side or the righthand side, so that errors may be possible during the insertion thereof over an axial shaft of the photographic apparatus.

In order to overcome this difficulty, and according to the main characteristic of the present invention, the reel comprises a hub, a pair of disc shaped flanges integral with the ends of the hub, said hub having a central hub provided adjacent each said flange with a different number of teeth extending in the inward direction adjacent said hub.

This reel consequently has the great advantage that mistakes are avoided when placing the spool in place on the shaft.

The invention will be described with reference to the accompanying drawings, in which:

FIG. 1 is a side view of one side of the reel from the upper side of FIG. 2.

FIG. 2 is an axial section of the reel taken on line 2—2 of FIG. 1.

FIG. 3 is a side view of the other side of the reel from the lower side of FIG. 2.

FIG. 4 is a top plan view of the reel showing both flanges.

In the figures, the reel is shown generally at 1, having a hub shown generally at 2, which has a central bore. The inner wall of the hub is shown at 3, and the outer wall is shown at 5. The outer periphery of outer wall 5 is provided with a longitudinal slot 11 having an enlarged portion 12.

The film 9 is wound around the hub.

Disc shaped flanges 7 and 8 are attached to the respective ends of the hub.

At the end of the hub shown in FIG. 1, the portion of flange 7 adjacent interior wall 3 of the hub is provided with three notches or projecting fingers, or teeth, 13, 13, projecting inwards. The shaft on which the reel is mounted is provided with three grooves which respectively receive the three teeth on the internal periphery of the axial bore in flange 7. In FIG. 2 a projection is shown at 13. The flange 7 has openings 15 between inner wall 3 and outer wall 5.

The central axial aperture in the other flange 8 is provided with four projecting teeth 14, having intervening spaces. In this way the reel can be placed on the shaft only from the side of flange 7 having three teeth.

The reel can be formed of light metal or of molded plastic.

Instead of three teeth, and four teeth, on the respective flanges, the number of teeth may be numbers other than three and four, providing the number of teeth is different on the two flanges.

The present invention is capable of considerable modifications.

I claim:

1. A one-piece reel for winding of material in the shape of strips of considerable length thereon comprising a cylindrical inner wall and a cylindrical outer wall concentric with said inner wall, radial partitions for keeping said two walls spaced apart, a slot in said outer wall for receiving the film end, a pair of disc shaped flanges of which one is integral with one end of the two walls and the other is integral with the other end of said outer wall, said inner wall defining a central bore having at its respective ends a different number of teeth extending in the inward direction of said bore.

2. A one-piece reel according to claim 1, wherein the bore of the hub has three teeth at one end and four teeth at its other end.

References Cited

UNITED STATES PATENTS

| | | | |
|---|---|---|---|
| 971,317 | 9/1910 | Sharlow | 242—74 |
| 3,136,415 | 6/1964 | Sandstrom | 242—71.8 X |
| 3,155,338 | 11/1964 | Uterhart | 242—74 |

NATHAN L. MINTZ, Primary Examiner